United States Patent Office 2,897,193
Patented July 28, 1959

2,897,193

SULFURIC ACID ESTERS OF DEXTRANIC ACID

Leo J. Novak, Dayton, Ohio, assignor to The Commonwealth Engineering Company of Ohio, Dayton, Ohio, a corporation of Ohio No Drawing. Application May 28, 1954
Serial No. 433,301

3 Claims. (Cl. 260—234)

This invention relates to sulfuric acid esters of dextranic acid, and alkali metal and alkaline earth metal salts thereof.

Dextranic acid is an organic acid which may be obtained in other ways, as by synthesis, but which is produced as a by-product in the partial hydrolysis of high molecular weight dextran by an enzyme elaborated by molds of the genus Aspergillus, notably *Aspergillus wentii*, when the dextran of high molecular weight is subjected to the splitting action of the enzyme in aqueous media and remains in the supernatant when the hydrolyzed dextran is precipitated from the aqueous media. Methods for obtaining the dextran-splitting enzyme elaborated by *A. wentii* are described in Carlson et al., U. S. 2,709,150, issued May 24, 1955.

This acid, dextranic acid, usually has a molecular weight between 5000 and 50,000 as determined by light-scattering measurements, and is recovered from the medium in which the dextran is split as a white powder which forms aqueous solutions of comparatively low relative and intrinsic viscosity.

The present application is concerned with sulfur acid esters of the dextranic acid, and salts thereof. These esters can be produced under different conditions. Preferably, the dextranic acid is reacted in pyridine with chlorosulfonic acid at elevated temperatures of from 50 to 100° C. Upon completion of the esterification, the reaction mixture is poured into cold water, then into alcohol, neutralized with an alkali metal hydroxide to precipitate the corresponding alkali metal or alkaline earth metal salt of the ester, the salt is recovered and dissolved in water, and the resulting aqueous solution is dialyzed and concentrated to produce the salt as a fine white, or almost white, dry powder. These salts may also be recovered by precipitation from the aqueous alkaline solutions by the addition of several volumes of alcohol or other precipitant.

The alkali metal and alkaline earth metal salts of dextranic acid sulfuric acid esters are preferred forms of the invention, being white or light-colored fine powders characterized by ready solubility in water. The free acid of the esters can be recovered by dialyzing solutions of the metal salts after acidification with a mineral acid, and evaporation at low temperature under high vacuum. The sulfuric acid esters of dextranic acid have low relative viscosities in the range of 1.01 to 1.2. These derivatives are all soluble in water, in almost (⅔) saturated ammonium sulfate, and in 80% alcohol, insoluble in the presence of excess cations in alcoholic solutions of greater than 40% strength. They are soluble in 1.0 N acid and in 1.0 N alkali. The esters and their alkali metal and alkaline earth metal salts have, on analysis, a sulfur content or value of from 3 to 20%, the sodium salts being preferred species.

The following examples are given to illustrate particular embodiments of the invention. It is to be understood that the examples are not intended to be limitative.

*Example I*

A mixture of 7.0 mls. of chlorosulfonic acid, 30.0 mls. of pyridine, and 1.0 gm. of dextranic acid was heated for 45 minutes at 77° C. and then for an additional 45 minutes at 100° C. The color changed to light brown. The liquid was poured into 200 mls. of cold (5° C.) water, then into 475 mls. of methyl alcohol. The mass was cooled in the ice bath, the color becoming straw yellow. It had a pH of 3.88 at 10° C. The pH was adjusted to 7.0 with sodium hydroxide. A flocculent precipitate formed, and was filtered, washed with 200 mls. of methyl alcohol, and vacuum tray dried at 25° C. Yield, 14.37 gms. of a white powder.

The 200 mls. of methyl alcohol used for washing the precipitate caused additional precipitation in the original filtrate. Therefore, an additional 100 mls. of methyl alcohol were added, giving complete crystallization of a crystalline product. This was combined with the first precipitate to obtain the 14.37 gms.

About 7.0 gms. of this white powder were dissolved in 40 mls. of water. The resulting muddy brown solution was dialyzed for 24 hours against a total of 6.0 liters of distilled water. The solution (80 mls.) had a ph of 7.81. It was evaporated to dryness and the residue was re-dissolved in 30 mls. of water and poured into 180 mls. of methyl alcohol. This solution mixture (pH 7.15) was adjusted to pH 6.65 with acetic acid, causing the cloudy precipitate to settle rapidly. The precipitate was filtered and dried under vacuum. It gave 28.4% ash which by calculated analysis was all sodium sulfate, indicating an average D.S. of approximately 3.0 for dextranic acid sulfate.

This sodium salt of the ester was highly effective as an anticoagulant for blood, as proved by the following test:

The sodium salt was dissolved in water adjusted to pH 7.0, the solution was filtered to remove a slight precipitate and diluted to 25.0 mls. of a 2.0% solids solution.

A rabbit having an open, bleeding wound was injected intravenously with 9.0 cc. of the sample. While localized pressure was applied at various time intervals, the bleeding did not cease until 45 minutes after the injection of the salt, as compared to a normal coagulation time of a few minutes for a control rabbit not injected with the aqueous solution of the salt. The rabbit was not harmfully affected by the salt. When it was observed 24 hours later, no abnormal reactions or side effects were noted.

The anti-coagulating action of the sodium salt of the dextranic acid sulfate on human blood was also determined in vitro. The sodium salt of the ester was mixed with human blood in dilutions of 1:4, 1:6, 1:8 and 1:10, and the mixtures were observed for coagulation. No coagulation was observed after two hours whereas the normal coagulation time for human blood is within five minutes.

Centrifuging of the mixtures of the sodium salt of the dextranic acid sulfate and human blood showed no hemolysis of the erythrocytes. The amount of chlorosulfonic acid used in the reaction may be varied and may be such that the average D.S. with respect to the sulfate groups is from 1.0 to 3.0.

*Example II*

A dextranic acid in the range of 50,000 molecular weight by light scattering was esterified as in Example I at 100° C. for one hour to obtain a sodium salt of the dextranic acid sulfuric acid ester containing approximately 20% sulfur.

*Example III*

A low molecular weight dextranic acid in the range 5,000 by light scattering was converted to the sulfuric acid ester by the procedure of Example I. The sodium salt of the ester contains approximately 20% sulfur.

Example IV 162 gms. of a dextranic acid with a molecular weight ranging from 5000 to 50,000 by light scattering was converted to a dextranic sulfuric acid ester sodium salt with a sulfur content of 12.1% (an average D.S.=1 for $SO_3Na$) by reacting it with 116.5 gms. of chlorosulfonic acid, following the procedure of Example I.

Example V

Finely divided dextranic acid of 25,000 molecular weight was mixed with formamide (40 ml. of formamide per gram of dextranic acid) and held at 50° C. until a viscous solution was obtained. An equal volume of pyridine and about one-half the volume of chlorosulfonic acid were added. The mixture was held at 50° C. with intermittent stirring for about two hours after which it was poured into cold water (200 ml./gm. of acid). Sodium hydroxide was added slowly to pH 7.0–9.0. Alcohol was then added until the sodium salt of the dextranic acid sulfuric acid ester was completely precipitated. The pH should preferably be above 7.0. The precipitate was dissolved and reprecipitated by the addition of several volumes of alcohol. This last-mentioned precipitate was separated and dried in vacuum. The sodium salt thus produced contained approximately 20% sulfur.

Example VI

A low molecular weight (2500) dextranic acid sulfonated by the method of Example V resulted in a fully substituted (D.S.=2.7–3.0) sodium salt of dextranic acid sulfuric acid ester having a sulfur content of about 15%.

Example VII

Dextranic acid in finely divided powder form was cooled to between —5° C. and —15° C. About 40 to 60 parts of chlorosulfonic acid were cooled to the same temperature and added to the cold dextranic acid, the mixture being kept at —15° C. to 5° C. for about 10 minutes. The reaction mixture was poured, with vigorous agitation, into 300 parts of crushed ice, neutralized with 10 N sodium hydroxide and dialyzed. The dialyzed solution was concentrated at ordinary temperature in vacuum, and the resulting sodium salt of the dextranic acid sulfuric acid ester was precipitated with alcohol. The precipitate was redissolved, dialyzed and dried by sublimation. It contained approximately 20% sulfur and had a D.S. near 3.0.

Example VIII

Low molecular weight (5000 by light scattering) dextranic acid was reacted with chlorosulfonic acid as in Example VII for 15 minutes at —10° C. to —15° C. The salt obtained had a sulfur content of 5%.

Example IX

Dextranic acid of molecular weight about 50,000 was treated as in Example VII for one hour during which the temperature rose from —20° C. to —5° C. The isolated salt had a 20% sulfur content.

Example X

High average molecular weight (50,000) dextranic acid was treated as in Example VII for 10 minutes at 5° C. to —10° C. The isolated purified sodium salt was found, on analysis, to have a sulfur content of 18%.

Example XI

High average molecular weight dextranic acid was converted to the sodium salt of the sulfuric acid ester by the procedure of Example VII and the isolated, purified sodium salt was found to contain 20% of sulfur.

Example XII

Dextranic acid of low average molecular weight (5000 to 10,000) was esterified with chlorosulfonic acid in accordance with the method of Example VII. The sodium salt in the isolated purified form contained 3% of sulfur.

Example XIII

The sodium salt of the dextranic acid sulfate of Example VII was dissolved in water and acidified with 6 N hydrochloric acid to pH 1.0. The aqueous acidic solution was dialyzed thoroughly against water. The resulting dialyzed solution of the free acid form of dextranic acid sulfate was then evaporated under high vacuum and low temperature to obtain an almost white fluffy powder which was readily soluble in water and had a sulfur content of 17.0%.

The dextranic acid used in the foregoing examples was obtained as follows:

500 gms. of native dextran [produced by inoculating a sucrose-bearing nutrient medium with the microorganism *Leuconostoc mesenteroides* B–512 (Northern Regional Research Laboratory designation) and incubating the mass for maximum dextran production] were dissolved in 4500 cc. of water, together with 500 cc. of dextran-splitting enzyme from *Aspergillus wentii* (obtained by growing the mold and as described in the U.S. patent to Carlson et al. supra) and the solution was digested at pH 4.3 at 70° F. to a viscosity of 3.0 in 5½ hours. Five liters of isopropanol were added and the supernatant was separated from the precipitate and adjusted to pH 11.8 with 10% alcoholic sodium hydroxide. The precipitate which formed was separated, re-dissolved in 200 mls. of water, adjusted to pH 2.5 with hydrochloric acid. An equal volume of isopropanol was added and the precipitate formed was separated. The oily supernatant was adjusted to pH 10.0 with 10% alcoholic sodium hydroxide, and the dextranic acid thus precipitated was separated, washed with 99% isopropanol and vacuum dried. The free dextranic acid is non-hygroscopic, soluble in water and in 80% methanol. It is not precipitated with barium chloride.

As will be apparent from the examples, although the procedure of Example I is preferred, the esters and their salts may be obtained under other conditions. Thus, as illustrated in Example V, the esterification may be effected in a mixture of formamide and pyridine, or the dextranic acid and chlorosulfonic acid may be mixed and reacted together in the cold, as shown in Example VII for instance.

The sulfated dextranic acids and their sodium salts, in addition to being anti-coagulants for blood are useful for various other purposes. The acids are particularly valuable for the inhibiting effect they exert on the specific enzyme, hyaluronidase. This enzyme exists in certain bacteria, venoms, spermatozoa and other sources and performs a function in the process of invasion of cells and tissue by depolymerizing or hydrolyzing hyaluronic acid, an important substance of connective tissue. Inhibitors of the depolymerizing action of hyaluronidase on hyaluronic acid are of value as contraceptives, for the prevention of invasion by microorganisms.

Inhibition of the depolymerizing action of hyaluronidase on hyaluronic acid by the dextranic acid sulfuric acid esters can be determined in the known way, by mixing a suitable amount of the dextranic acid ester with hyaluronic acid and then adding 50 micrograms of hyaluronidase per 4 ml. of the solution. The tests may be conducted at 25° C. with hyaluronic acid having a relative viscosity of 7–8 for a 1.0 gm./l. solution in 0.05 M sodium chloride and 0.05 M pH 7 phosphate buffer or with smaller concentrations of the phosphate buffer. Hyaluronic acid having a relative viscosity as low as 2 for the 1.0 gm./liter solution may be used. Hyaluronidase from bull testes may be used at 12.5 mg./l., or using larger or smaller concentrations of the enzyme at 37° C. The depolymerization of hyaluronic acid by the hyaluronidase is accompanied by a drop in the viscosity of the hyaluronic acid solution, the time required for the viscosity to fall half way from the initial to the calculated or presumed final value being taken as a measure of the rate of enzyme action. The extent to which the dextranic acid sulfate inhibits the action of the hyaluronidase on the hyaluronic acid is guaged by the extent and rate of the decrease in viscosity of the solution containing the hyaluronic acid, the hyaluronidase and the dextranic acid sulfate.

Various modifications may be made in practicing the invention, including the use of other alkali metal hydroxides such as potassium hydroxide in the neutralization step. Since such modifications may be made in the details exemplified within the scope of the disclosure and the spirit of the invention, it is to be understood that it is not intended to limit the invention except as it is defined in the appended claims.

What is claimed is:

1. As a new product, an alkali metal salt of sulfuric acid ester of the carboxylated polymer obtained as by-product when native dextran is split into segments suitable for use as blood plasma extenders by the dextran-splitting enzyme produced by the mold *Aspergillus wentii*, said salt having a sulfur content between 3% and 20%.

2. As a new product, a sulfuric acid ester of the carboxylated polymer obtained as by-product when native dextran is split into segments suitable for use as blood plasma extender by the dextran-splitting enzyme produced by the mold *Aspergillus wentii*, said ester having a sulfur content between 3% and 20%.

3. As a new product, the sodium salt of a sulfuric acid ester of the carboxylated polymer obtained as by-product when native dextran is split into segments suitable for use as blood plasma extenders by the dextran-splitting enzyme produced by the mold *Aspergillus wentii*, said salt having a sulfur content between 3% and 20%.

References Cited in the file of this patent

UNITED STATES PATENTS

| | | |
|---|---|---|
| 2,638,469 | Alburn | May 12, 1953 |
| 2,715,091 | Ricketts et al. | Aug. 9, 1955 |

FOREIGN PATENTS

| | | |
|---|---|---|
| 603,571 | Great Britain | June 18, 1948 |

OTHER REFERENCES

Whistler et al.: "Polysaccharide Chemistry" (1953), p. 19, lines 19–22, Academic Press Inc., New York.